United States Patent
Michieli et al.

(10) Patent No.: US 11,820,166 B2
(45) Date of Patent: Nov. 21, 2023

(54) CARDS WITH NON-VISIBLE PRODUCTION INDICIA AND RELATED SYSTEMS

(71) Applicant: CPI CARD GROUP—COLORADO, INC., Littleton, CO (US)

(72) Inventors: Maxmillian David Michieli, Littleton, CO (US); Martha Lee Blair, Castle Rock, CO (US); Jeremiah Witte, Castle Rock, CO (US); Dean Scott Campbell, Littleton, CO (US)

(73) Assignee: CPI CARD GROUP—COLORADO, INC., Littleton, CO (US)

( * ) Notice: Subject to any disclaimer, the term of this patent is extended or adjusted under 35 U.S.C. 154(b) by 61 days.

(21) Appl. No.: 16/756,535

(22) PCT Filed: Oct. 25, 2018

(86) PCT No.: PCT/US2018/057483
§ 371 (c)(1),
(2) Date: Apr. 16, 2020

(87) PCT Pub. No.: WO2019/084250
PCT Pub. Date: May 2, 2019

(65) Prior Publication Data
US 2020/0290395 A1 Sep. 17, 2020

Related U.S. Application Data

(60) Provisional application No. 62/578,152, filed on Oct. 27, 2017.

(51) Int. Cl.
*B42D 25/45* (2014.01)
*B42D 25/387* (2014.01)
(Continued)

(52) U.S. Cl.
CPC ........... *B42D 25/45* (2014.10); *B42D 25/387* (2014.10); *B32B 2425/00* (2013.01); *B41M 3/14* (2013.01); *B42D 25/475* (2014.10)

(58) Field of Classification Search
CPC ................................ B42D 25/45; B42D 24/45
(Continued)

(56) References Cited

U.S. PATENT DOCUMENTS 4,818,852 A * 4/1989 Haddock .............. B42D 25/425
235/462.01
5,862,243 A * 1/1999 Baker ....................... B07C 3/14
382/101

(Continued)

OTHER PUBLICATIONS

PCT, "International Search Report and Written Opinion from App. No. PCT/US2018/057483", 13 pages.

*Primary Examiner* — Rafferty D Kelly
(74) *Attorney, Agent, or Firm* — Dorsey & Whitney LLP

(57) ABSTRACT

An improved data bearing card includes a card body, personalization data unique to the data bearing card, and non-visible production indicia, separate from the personalization data, disposed on the card body and indicative of production-related information not otherwise provided on the data bearing card. The non-visible production indicia may be indicative of a corresponding piece of production equipment and/or an operator thereof utilized in connection with the data bearing card, or of a location of a corresponding region of a sheet assembly from which the corresponding card body was separated during production, or of other production-related information. The non-visible production indicia facilitates remedial action in the event that a defect or near-defect is found in the card body or other components of the data bearing card, and may otherwise facilitate card tracking during the production process.

22 Claims, 8 Drawing Sheets

(51) Int. Cl.
*B42D 25/475* (2014.01)
*B41M 3/14* (2006.01)
(58) Field of Classification Search
USPC .......................................... 235/380
See application file for complete search history.

(56) References Cited

U.S. PATENT DOCUMENTS

| | | |
|---|---|---|
| 6,688,529 B1 | 2/2004 | Goade |
| 2004/0144472 A1 | 7/2004 | Cowie |
| 2005/0067497 A1* | 3/2005 | Jones .................... B42D 25/23 235/492 |
| 2007/0108757 A1 | 5/2007 | Buck |
| 2009/0309254 A1 | 12/2009 | Pugh et al. |
| 2013/0292902 A1* | 11/2013 | Shigeta .................... A63F 1/18 273/148 R |

* cited by examiner

CARDS WITH NON-VISIBLE PRODUCTION INDICIA AND RELATED SYSTEMS

CROSS REFERENCE TO RELATED APPLICATIONS

This application is a national stage application under 35 U.S.C. § 371 of International Application No. PCT/US2018/057483 filed Oct. 25, 2018, entitled "CARDS WITH NON-VISIBLE PRODUCTION INDICIA AND RELATED SYSTEMS," which claims the priority benefit of U.S. Provisional Patent Application No. 62/578,152 filed Oct. 27, 2017, entitled "CARDS WITH NON-VISIBLE PRODUCTION INDICIA AND RELATED SYSTEMS", the contents of each of which are hereby incorporated herein by reference in their entirety.

BACKGROUND OF THE INVENTION

Data bearing cards are employed in a wide variety of applications, including transaction cards (e.g. credit cards, debit cards, store-value cards and loyalty/membership cards), identification cards (e.g. cards for verifying the identity of a card holder), and access cards (e.g. cards provided for use in accessing controlled premises). Such data bearing cards typically include personalization data unique to each given card (e.g. data uniquely associated with a specific payment account and/or authorized card holder and/or other stored record).

As may be appreciated, data bearing cards are typically produced and personalized in large quantities by a given card manufacturer to fulfill a given card order. In some instances, a number of data bearing cards produced for a given order may include a number of data bearing cards that are either defective or within a determinable range of being defective. However, upon inspection of the defective or near-defective data bearing cards, a card manufacturer may not be able to accurately determine a specific production-related source of the defects or near-defects, thereby making it difficult for the card manufacturer to take effective and efficient remedial action, including for example, replacement of defective data bearing cards and/or correction of the production-related source of such defects or near-defects.

SUMMARY OF THE INVENTION

The present disclosure encompasses data bearing cards and related production systems and methodologies that employ non-visible production indicia on the cards that facilitates improved remedial action by a card manufacturer in response to a determination that one or more defects or near-defects are present in one or more data bearing cards or card bodies produced by the card manufacturer and/or that otherwise facilitates the tracking of data bearing cards or card bodies thereof during production by the card manufacturer.

In one embodiment, a data bearing card is provided that includes a card body, personalization data unique to the data bearing card, and non-visible production indicia, disposed on the card body and indicative of production-related information not otherwise provided on the data bearing card. In the later regard, the non-visible production indicia may be separate from and/or otherwise non-indicative of the personalization data.

The non-visible production indicia may be of a type that becomes visible or otherwise detectable when viewed with use of a complimentary type of detection device, as will be further addressed. In turn, upon detection of the production indicia the production-related information may be determined. As may be appreciated, production-related information may be employed to facilitate remedial action in the event that a defect or near-defect is found in the card body or other components of the data bearing card and/or to otherwise facilitate tracking of data bearing cards or card bodies thereof during production of the data bearing cards.

In some embodiments, the non-visible production indicia may be indicative of at least one of the following:
  a location of a corresponding one of a predetermined plurality of regions of a sheet assembly from which the corresponding card body is separated during production as one of a plurality of separated card bodies (e.g. a location of a region within a given row and/or column of regions comprising the plurality of regions of the sheet assembly);
  a corresponding piece of equipment utilized in connection with the production of the corresponding data bearing card or card body;
  at least one of a corresponding type of and corresponding source of material utilized to produce the corresponding card body;
  at least one corresponding operator of at least one corresponding piece of equipment utilized in connection with the production of the corresponding data bearing card or card body;
  a corresponding process utilized in connection with the production of the corresponding data bearing card or card body (e.g. including automated and/or manual processes); and,
  a corresponding production batch produced to fulfill a corresponding order for a plurality of data bearing cards that includes the corresponding data bearing card.

By way of example, the ability to determine a sheet assembly location from which a given defective card body was separated during production of a corresponding plurality of data bearing cards may allow the card manufacturer to take improved remedial action in relation to selective replacement of defective data bearing cards having associated sheet assembly locations and/or in relation to the repair/replacement of production equipment utilized in relation to the given sheet assembly location.

In some implementations, the non-visible production indicia may be of a type that is non-visible to the human eye when illuminated with electro-magnetic radiation within the wavelength range of about 390 mm to 700 mm. In particular, the non-visible production indicia may comprise a non-visible ink marking that is printed within a predetermined location on the card body. In some implementations, the non-visible production indicia is a non-visible ink that comprises at least one of the following:
  an ultra-violet light sensitive ink;
  an infrared light sensitive ink; and,
  a polarized light sensitive ink.

In turn, upon viewing the otherwise non-visible ink marking with use of a complimentary detective device comprising a complimentary electro-magnetic radiation source (e.g. an ultra-violet, infrared or polarized light source), the production indicia may be detected (e.g. via human and/or automated detection) and the corresponding production-related information may be determined (e.g. via human and/or automated determination).

Additionally or alternatively, in some embodiments, the non-visible production indicia may comprise at least one non-visible particle having a size that is not visible to the human eye. For example, the non-visible production indicia may comprise one or more particles provided on the card body and having a maximum cross-dimension that is less than about 0.1 mm. In turn, upon viewing the otherwise non-visible particles with use of a complimentary detection device comprising a complimentary magnification device, the production indicia may be detected and the production-related information may be determined.

In some implementations, the non-visible production indicia may comprise one or more micro-particle taggants. By way of example, such taggants may comprise one or a plurality of colored layer(s) that have a predetermined meaning associated therewith, one or a plurality of layer(s) having a coloration that is ultra-violet light sensitive (e.g. not visible unless viewed under predetermined ultra-violet light) and/or infrared light sensitive (e.g. not visible unless viewed under a predetermined infrared light), and/or one or a plurality of marking(s) disposed thereupon (e.g. a marking that includes human readable characters and/or that is otherwise machine-readable).

In some embodiments, a plurality of non-visible particles each bearing the same non-visible production indicia may be dispersed across and/or within the card body in an amount sufficient to insure detectability of at least one of the particles (e.g. within a predetermined location) on the card body with use of a complimentary detection device. In one approach, the particles may be dispersed within an ink that is printed on the card during production (e.g. an otherwise visible ink utilized for printed graphics and/or human-readable characters). In another approach, the particles may be dispersed within a material defining or coating applied across one or more layers of the card body. In either case, the particles may each bear non-visible production indicia indicative of at least one of a corresponding type of and corresponding source of material utilized to produce the corresponding card body.

In some implementations, the card body may include a first core layer, wherein the predetermined location of the non-visible production indicia is provided on the first core layer. The card body may further include a transparent first outer layer disposed on a first side of the first core layer in overlying relation to the non-visible production indicia.

In conjunction with such embodiments, the data bearing card may further include visible printing on the first core layer. In such implementations, the visible printing and non-visible production indicia may each be disposed within a common region of the first core layer (e.g. a region within which visible graphics, visible human-readable characters and/or a visible machine-readable marking(s) are printed). In that regard, the visible printing and non-visible production indicia may each be printed on the first core layer in a continuous printing operation.

In another embodiment, a sheet assembly for providing a plurality of card bodies for a plurality of data bearing cards is provided. The sheet assembly may include at least a first layer (e.g. a continuous layer of material), and non-visible production indicia disposed within each of a predetermined plurality of regions of the sheet assembly on the first layer thereof, wherein each of the predetermined plurality of regions corresponds with a different one of the plurality of card bodies. In turn, for each of the predetermined plurality of regions, the non-visible indicia may be indicative of production-related information.

In contemplated embodiments, for each given region of the plurality of predetermined plurality of regions of the sheet assembly, the non-visible production indicia may be indicative of at least one of the following:

a corresponding location of the given region on said sheet-assembly;

a corresponding piece or portion of equipment utilized in connection with the production of the corresponding card body;

at least one of a corresponding type and a corresponding source of material comprising the sheet assembly;

a corresponding process utilized in connection with the production of the corresponding card body;

at least one corresponding operator of at least one corresponding piece of equipment utilized in connection with the production of the corresponding card body; and, a corresponding production batch produced to fulfill a corresponding order for a plurality of data bearing cards.

For example, the predetermined plurality of regions may be arranged in a predetermined plurality of rows and columns. In turn, for each given region of the predetermined plurality of regions, the non-visible production indicia may be indicative of at least one or both of the corresponding row and corresponding column of the given region.

In some implementations, for each of the predetermined plurality of regions of the sheet assembly the corresponding non-visible production indicia may comprise at least one of the following:

a non-visible ink printed on the first layer; and, a non-visible particle supported by the first layer.

In turn, the sheet assembly may further include a transparent second layer interconnected to the first layer and overlying the non-visible production indicia located within each of the plurality of regions. As may be appreciated, the utilization of a transparent second layer facilitates protection of the first layer and non-visible production indicia provided thereupon, while also accommodating later detection of the non-visible production indicia on one or more of the data bearing card bodies of the corresponding plurality of data bearing cards with use of a complimentary detection device.

In additional embodiments, a method may be provided for use in connection with the production of a plurality of data bearing cards that each include a corresponding card body, corresponding personalization data unique to the data bearing card, and corresponding non-visible production indicia indicative of production-related information not otherwise provided on the data bearing card, comprising the step of providing non-visible production indicia in each of a predetermined plurality of regions on at least one of a top side and a bottom side of a first layer of a sheet assembly, said non-visible production indicia being indicative of product-related information. Further, the method may include separating a plurality of card bodies from the sheet assembly in corresponding relation to the predetermined plurality of regions of the sheet assembly, and supplying personalization data to each of the plurality of card bodies to define the plurality of data bearing cards, after the providing and separating steps. For example, the predetermined plurality of regions may be arranged in a predetermined plurality of rows and columns. In turn, for each given region of the predetermined plurality of regions, the non-visible production indicia may be indicative of at least one or both of the corresponding row and corresponding column of the given region.

In some implementations, for each of the predetermined plurality of regions the corresponding non-visible production indicia may comprise at least one of the following:

a non-visible ink printed on the first layer; and, a non-visible particle supported by the first layer.

In turn, the method may further include the step of interconnecting a transparent first outer layer sheet to said at least one of a top side and a bottom side of the first layer, prior to the separating and supplying steps.

In some embodiments, the providing step may include printing the non-visible production indicia in each of the plurality of regions on said at least one of a top side and a bottom side of the first layer. Further, such printing may further comprise printing of at least one of the following in each of the plurality of regions on said at least one of a top side and a bottom side of the first layer:
  visible graphics;
  visible human-readable characters; and,
  a visible machine-readable marking.

In turn, the method may further include interconnecting a transparent first outer layer sheet to the at least one of a top side and a bottom side of the first layer, prior to separating and supplying steps.

In some implementations, the method may further include using a detection device to view the non-visible production indicia on at least one of the plurality of card bodies or data bearing cards, wherein the corresponding production-related information may be determined and employed to facilitate remedial action in response to an identified defect or near-defect and/or to otherwise facilitate tracking during production. In later regard, the method may include using a first detection device to view the non-visible production indicia in at least one of the plurality of regions in relation to at least one or both of the printing step and the interconnecting step, wherein the corresponding production-related information is employable to track a location of the sheet assembly during production. As may be appreciated, the first detection device or one or more additional detection device(s) may be provided for use in viewing the non-visible production indicia in one or more of the plurality of regions in relation to one or more additional production steps utilized during production of the plurality of card bodies, wherein the corresponding production-related information may be employed to track the location of the plurality of data bearing cards or card bodies. In turn, location information and corresponding time information may be stored and utilized to provide production status information, scheduling information and/or to assess and address production resource requirements.

In further embodiments, a system may be provided for use in connection with the production of a plurality of data bearing cards that each include a corresponding card body, corresponding personalization data unique to the data bearing card, and corresponding non-visible production indicia indicative of product-related information not otherwise provided on the data bearing card. In such embodiments, the system may include card production equipment for use in connection with the production of the plurality of data bearing cards, and a card production processor for maintaining stored information in a database pertaining to utilization of the card production equipment in connection with the production of the plurality of data bearing cards. Further, the system may include at least one detection device for use in viewing at least one of the plurality of data bearing cards or plurality of card bodies to allow detection of the corresponding non-visible production indicia and a determination of the corresponding production-related information, wherein said card production processor is operable to employ the corresponding production-related information and the stored information to facilitate one or both of:
  remedial action in response to the identification of defect or near-defect in the at least one of said plurality of data bearing cards or plurality of card bodies; and,
  tracking of the at least one of said plurality of data bearing cards or plurality of card bodies during production.

In conjunction with such functionality, the card production processor may also store the determined product-related information in the database.

In such embodiments, for each of the plurality of data bearing cards, the non-visible production indicia may be indicative of at least one of the following:
  a location of a corresponding one of a predetermined plurality of regions of a sheet assembly from which the corresponding card body was separated during production as one of a plurality of separated card bodies;
  a corresponding piece or portion of equipment utilized in connection with the production of the data bearing card or corresponding card body;
  at least one of a corresponding type of and corresponding source of material utilized to produce the corresponding card body;
  at least one corresponding operator of at least one corresponding piece of equipment utilized in connection with the production of the data bearing card or corresponding card body;
  a corresponding process utilized in connection with the production of the data bearing card or corresponding card body; and,
  a corresponding production batch produced to fulfill a corresponding order for said plurality of data bearing cards.

The detection device(s) may be operable to automatically provide the detected production indicia and/or corresponding production-related information to the card production processor for storage with the stored information and/or use in the facilitation of remedial action and/or location tracking.

For each of the plurality of data bearing cards, the corresponding non-visible production indicia may comprise at least one of the following:
  a non-visible ink; and,
  at least one non-visible particle.

In one approach, for each of the plurality of data bearing cards, the corresponding non-visible production indicia may comprise at least one of the following:
  an ultra-violet light sensitive ink;
  an infrared light sensitive ink; and,
  a polarized light sensitive ink.

In turn, the detection device(s) may comprise a complimentary electromagnetic radiation source.

In contemplated arrangements, for each of the plurality of data bearing cards the corresponding non-visible production indicia may be provided as a printed marking, and the production equipment may include printing equipment for providing the printed marking and additional visible printing on each of the plurality of data bearing cards, e.g. in a continuous automated printing operation. For example, the additional visible printing may comprise at least one of the following:
  visible graphics;
  visible human-readable; and,
  visible machine-readable marking.

Such additional visible printing may be provided on the same side and/or on an opposing side as the non-visible printed marking.

In another approach, for each of the data bearing cards the corresponding non-visible production indicia may comprise one or more non-visible particle as described herein (e.g. a plurality of particles having the same non-visible production indicia may be dispersed across at least a portion of each of the data bearing cards via inclusion in a coating or printed ink applied thereto, and/or inclusion in a material comprising a layer of the cards). In turn, the detection device(s) may comprise a magnification device.

In contemplated system implementations, the production equipment may include at least two or more of the following types of production equipment:
  printing equipment;
  collation equipment;
  lamination equipment;
  card body separation equipment;
  card body hot stamping equipment;
  card body milling/machining/integrated circuit chip module insertion/pre-personalization equipment;
  card personalization equipment;
  defect or near-defect identification equipment
  card order counting and auditing equipment; and
  card order packaging and marking equipment.

The production equipment may be operable to receive stored information from the card production processor (e.g. for use in operation of the equipment) and/or to provide production-related information to the card production processor for inclusion in the stored information. Further, a detection device may be provided at one or more locations corresponding with the production equipment for use in the detection of non-visible production indicia and determination of production-related information, wherein the production-related information and/or detected production indicia, and associated production equipment information (e.g. information identifying the equipment and a time at which the production indicia was detected), may be provided to and processed by and/or included in stored information at the card production processor. In turn, such information may be employed to facilitate remedial action pursuant to an identified defect or near-defect and/or to track data bearing cards and associated card bodies during production (e.g. production-related information indicative of a batch of cards corresponding with a given order may be employed with associated production equipment information to provide production status information, scheduling information and/or to assess and address resource requirements).

Numerous additional features and advantages of the present invention will become apparent to those skilled in the art upon consideration of the embodiment descriptions provided hereinbelow.

DETAILED DESCRIPTION

Figure 1A:
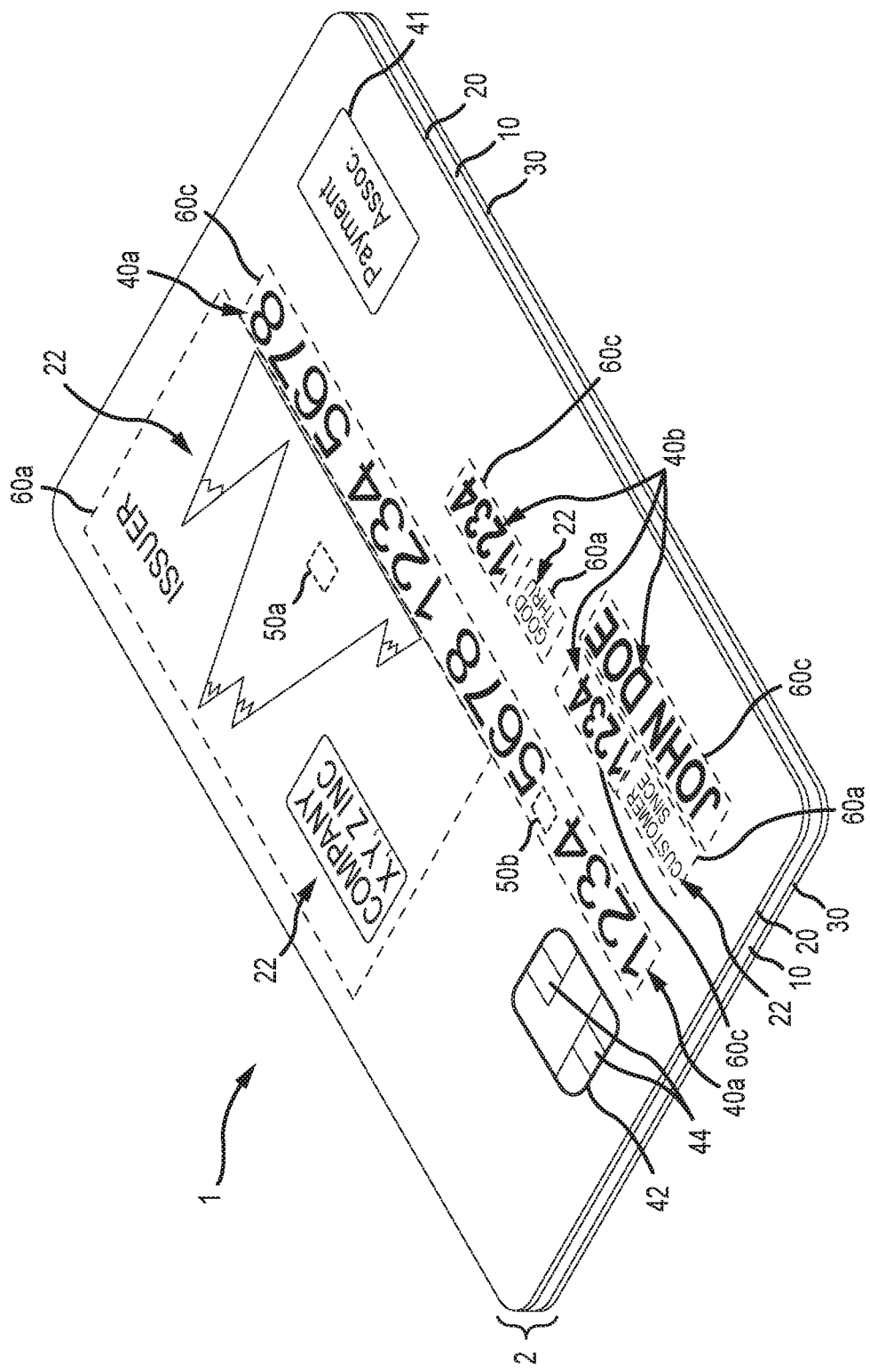
FIGS. 1A and 1B are perspective views of a first side and an opposing second side of an embodiment of a data bearing card that comprises non-visible production indicia indicative of production-related information.
Figure 1B:
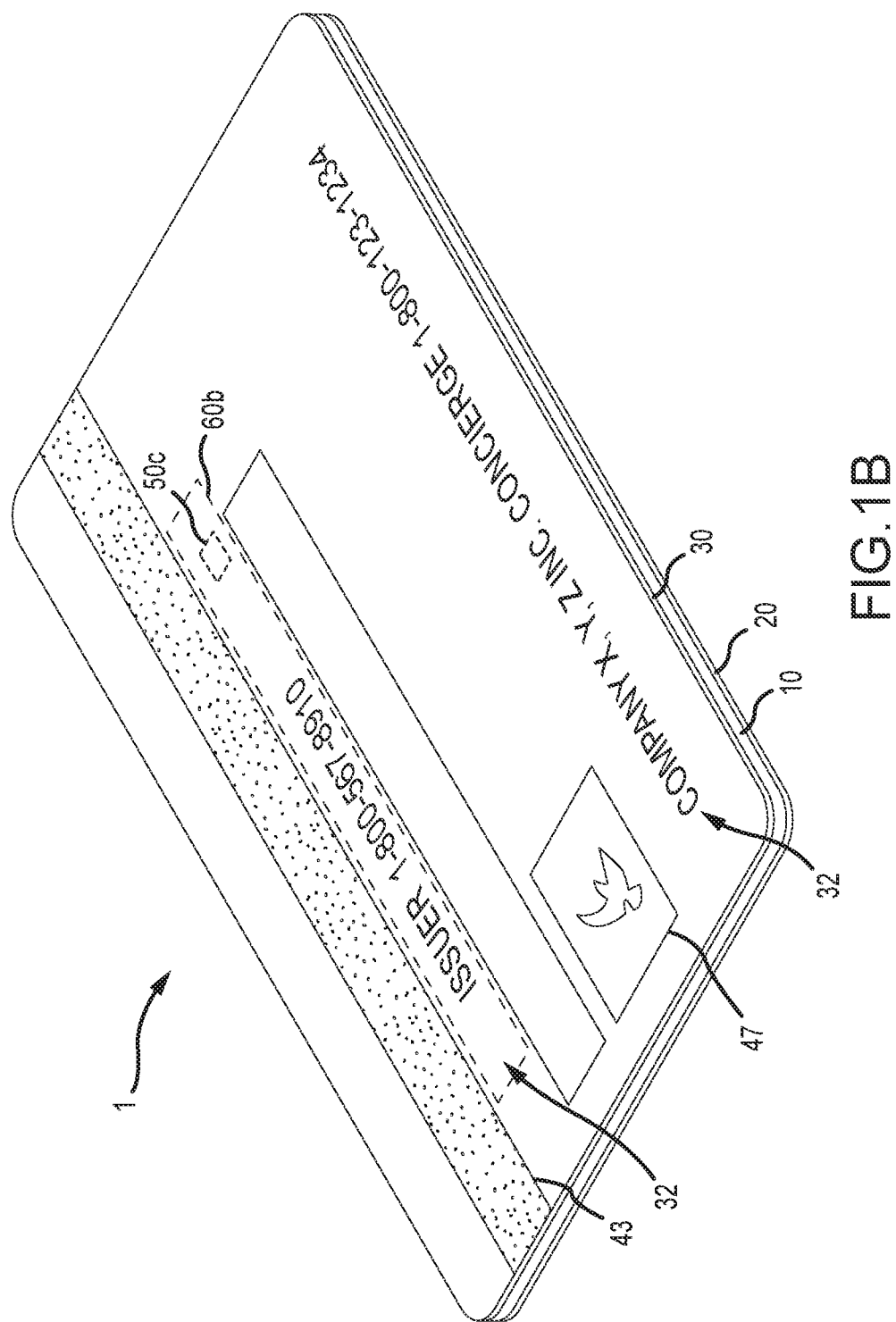

FIGS. 1A and 1B illustrate one embodiment of a data bearing card 1 that includes a card body 2, personalization indicia 40a, 40b unique to the data bearing card 1 (e.g. indicia uniquely corresponding to a predetermined account and/or authorized card holder and/or other stored record), and at least one predetermined location 50a, 50b or 50c on the card body 2 comprising non-visible production indicia (e.g. indicia not visible to the human eye) indicative of production-related information corresponding with and not otherwise provided on the data bearing card 1 and/or otherwise facilitates location tracking during production of the data bearing card 1. The provision of the non-visible production indicia facilitates remedial action in the event that a defect or near-defect is found in the card body 2 or other components of the data bearing card 1.

In FIGS. 1A and 1B the data bearing card 1 is in the form of a transaction card 1. In other embodiments data bearing card 1 may comprise an identification card, access card, or other card types that include a card body 2, personalization data unique to the given card, and non-visible production indicia corresponding with the card, as contemplated herein.

In the transaction card 1 of FIGS. 1A and 1B, the card body 2 may include at least one layer or a plurality of interconnected layers provided to define a predetermined card configuration, e.g. a card having a length, width and thickness in compliance with ISO/IEC Standard 7810. As illustrated in FIGS. 1A and 1B, card body 2 may include at least a first core layer 10, an optional protective first outer layer 20 interconnected to a first side of a first core layer 10 and/or an optional protective second outer layer 30 interconnected to a second side of the first core layer 10 opposite to the first side thereof. The transaction card 1 may further include printing 22 visible from a first side of the card body 2 and/or printing 32 visible from a second side of the card body 2. Printing 22 and/or 32 may comprise one or more predetermined print regions 60a and/or 60b that include corresponding graphics (e.g. a pictorial scene, a logo, a photo, etc.), corresponding human-readable characters (e.g. numbers, letters, and/or representations thereof) and/or one or more corresponding machine-readable markings (e.g. a bar code, a multi-dimensional matrix code, etc.).

In the embodiment shown in FIGS. 1A and 1B, printing 22 may be printed on a first side of an opaque first core layer 10 and printing 32 may be printed on a second side of the opaque first core layer 10, wherein the first outer layer 20 and second outer layer 30 may be transparent to facilitate viewing of printing 22 and printing 32, respectively. As will be further described, one or more predetermined locations 50a and/or 50c comprising non-visible production indicia may be disposed in one or more print regions 60a and/or 60b of printing 22 and/or printing 32.

In other embodiments in which card body 2 includes additional layers, printing 22 may be provided on an the outward-facing or inward-facing side of a transparent first core layer 10, together with non-visible production indicia, wherein one or more additional opaque layers of card body 2 may be interconnected to an inward-facing side of the transparent first core layer 10. In one approach, an opaque second core layer (not shown) may be interconnected to the second side of the first core layer 10, wherein printing 32 is provided on an outward-facing side of the opaque second core layer, together with non-visible production indicia. In another approach, one or more additional intermediate layer (not shown) may be interconnected to and between an inward-facing side the first core layer 10 and an inward-facing side of a second core layer (not shown) or second outer layer 30, wherein printing 32 may be provided on the intermediate layer or the second core layer, together with non-visible production indicia. By way of example, such intermediate layer may comprise one or more of a metallic member, an antenna and/or other electronic componentry interconnected to a substrate, or other configurations.

In the transaction card 1 of FIGS. 1A and 1B, personalization data 40a, 40b may comprise visible indicia indicative of or otherwise corresponding with an account or record uniquely associated with the transaction card 1 (e.g. a payment account administered by or on behalf of a card issuer payment institution). In some embodiments, visible personalization indicia 40a and/or 40b may be provided by embossing card body 2 to define the indicia. In other embodiments, visible personalization indicia 40a and/or 40b may be defined by printing on one or more layers of the card body 2. In still other embodiments, visible personalization indicia 40a and/or 40b may be defined in outward-facing surface of the first outer layer 20 (e.g. by at least one of laser engraving, ink jet printing and thermoprinting). Visible personalization data 40a, 40b may be provided in predetermined regions 60c, wherein one or more predetermined location 50b comprising non-visible production indicia may be disposed within one or more of such predetermined regions 60c.

The visible personalization indicia 40a may comprise human-readable characters indicative of a corresponding account (e.g. account number). Further, visible personalization indicia 40b may include additional human-readable data corresponding with a given account, including a corresponding card expiration date, a corresponding account service grade level, and/or corresponding customer-specific data (e.g. customer name, customer duration, data, etc.). In the transaction card 1 embodiment of FIGS. 1A and 1B, visible indicia 40a, 40b are provided for viewing from a first side of the transaction card 1. In other embodiments, visible indicia 40a and/or 40b may be also or alternately provided for viewing from the second side of the transaction card 1. As may be appreciated, the visible indicia 40a, 40b may be provided as personalization data on transaction card 1 as a part of card personalization processing.

As referenced above, transaction card 1 includes at least one predetermined location 50a, 50b or 50c on card body 2 comprising non-visible production indicia indicative of production-related information not otherwise provided on the transaction card 1. In that regard, the non-visible production indicia may be provided to be invisible to the human eye, but visible when viewed utilizing a complimentary detection device. In particular, upon a determination that a given card body 2 or transaction card 1 may include a production-related defect or near-defect (e.g. a product feature within a determinable range of being a production defect), the corresponding predetermined location 50a, 50b or 50c may be viewed utilizing a complimentary detection device to detect the corresponding production indicia and thereby determine the production-related information. In turn, the production-related information may be utilized by the corresponding card manufacturer to take efficient and effective remedial action.

In that regard, for a given transaction card 1 or card body 2, the corresponding non-visible production indicia may be indicative of one or more of the following types of production-related information:
  a location of a corresponding one of a predetermined plurality of regions of a sheet assembly from which the corresponding card body 2 was separated during production as one of a plurality of separated card bodies (e.g. a location of a region within a given row and/or column of regions);
  a corresponding piece of equipment utilized in connection with the production of the corresponding transaction card 1 or card body 2;
  at least one of a corresponding type of and corresponding source of material utilized to produce the corresponding card body 2;
  at least one corresponding operator of at least one corresponding piece of equipment utilized in connection with the production of the corresponding transaction card 1 or card body 2;
  a corresponding process utilized in connection with the production of the corresponding transaction card 1 or card body 2; and,
  a corresponding production batch produced to fulfill a corresponding order for a plurality of transaction cards that includes the corresponding transaction card 1.

In one instance, the ability to detect a non-visible production indicia and thereby determine a sheet assembly location from which a given defective card body 2 was separated during production of a corresponding plurality of transaction cards may allow the corresponding card manufacturer to take improved remedial action.

For example, the card manufacturer may be able to inspect additional ones of the plurality of transaction cards to detect corresponding non-visible production indicia and thereby determine that a specific row and/or column of sheet assembly regions of each sheet assembly utilized to fulfill a given order yielded corresponding defective card bodies 2, thereby allowing the card manufacturer to selectively replace the corresponding defective transaction cards with non-defective transaction cards (e.g. as opposed to replacing all transaction cards for the entire order). Additionally or alternatively, the card manufacturer may be able to inspect additional ones of the plurality of transaction cards to determine that a specific row and/or column of sheet assembly regions of each sheet assembly utilized to fulfill a given order yielded corresponding defective card bodies 2, thereby allowing the card manufacturer to identify a specific piece and/or portion of production equipment utilized in connection with the production of the defective card bodies 2, wherein the card manufacturer may take appropriate remedial action (e.g. repair, re-calibrate or otherwise replace such piece and/or portion of production equipment).

Similarly, for a given transaction card 1 or card body 2 determined to be defective or near-defective, the ability to determine non-visible production indicia and thereby determine a corresponding piece of equipment and/or process utilized in connection with the production of the given transaction card 1 or card body 2 may allow the corresponding card manufacturer to take appropriate remedial action (e.g. repair, re-calibrate or otherwise replace such production equipment, and/or to modify or otherwise replace such process). For example, for a given plurality of transaction cards 1 or card bodies 2 that were produced utilizing the same or substantially the same production equipment and that include different portions inspected by different inspection processes (e.g. an automated process and manual process), a card manufacturer may be able to further inspect one or more samples from each of the portions to identify defects or near defects and detect corresponding non-visible indicia indicative of the corresponding inspection process to assess the relative accuracy of the different inspection processes and thereby modify or otherwise replace one or more of such inspection processes.

As indicated, the non-visible production indicia may be provided to be invisible to the human eye (e.g. unaided by a complimentary detection device). In one approach, the non-visible production indicia may be of a type that is non-visible to the human eye when illuminated with electromagnetic radiation within a wavelength range of about 390 mm to 700 mm. For example, the non-visible production indicia may comprise a non-visible ink that is printed in a predetermined location 50a, 50b or 50c on one or more layers of the card body 2. When the non-visible production indicia is provided as a non-visible ink, the non-visible ink may comprise at least one of the following:

an ultra-violet light sensitive ink;

an infrared light sensitive ink; and, a polarized light sensitive ink.

In another approach, the non-visible production indicia may be of a size that is non-visible to the human eye. For example, the non-visible production indicia may comprise one or more particles disposed on one or more layers of the card body 2 and having a maximum cross-dimension that is less than about 0.1 mm. In that regard, the non-visible production indicia may comprise one or more micro-particle taggants (e.g. taggants that comprise one or a plurality of colored layers that have a predetermined meaning associated therewith, taggants that comprise one or a plurality of layer(s) having a coloration that is ultra-violet light sensitive (e.g. not visible unless viewed under predetermined ultra-violet light) and/or infrared light sensitive (e.g. not visible unless viewed under a predetermined infrared light) and that have a predetermined meaning associated therewith, and/or taggants that comprise human-readable or machine-readable).

The non-visible production indicia may be provided at any of a plurality of predetermined locations of the card body 2, including but not limited to the exemplary predetermined locations 50a, 50b and 50c shown in FIGS. 1A and 1B. For example, predetermined location 50a is shown as being within a graphics print region 60a of printing 22, predetermined location 50b is shown as being within a region 60b corresponding with visible personalization data 40a, and predetermined location 50c is shown as being within a human-readable characters print region 60c of printing 32.

Returning now to FIG. 1A, in some embodiments transaction card 1 may also include a pocket 42 defined in a first side of the transaction card 1, with a plurality of contact pads 44 and an underlying, electrically-interconnected integrated circuit (IC) chip (not shown) disposed within the pocket 42, wherein the contact pads 44 are located and exposed for contact with a chip card reader for signal transmissions therebetween to complete a financial transaction (e.g. at an ATM location, a point of sale location, etc.). As may be appreciated, contact pads 44 and interconnected IC chip (change) may be provided for electrical contact interface with contact chip card reader, e.g. in compliance with ISO/IEC Standard 7816. In that regard, the IC chip may be encoded during card personalization so as to store personalization data unique to the transaction card 1, e.g. encoded with data corresponding with the account indicated by visible indicia 40a. Additionally, an antenna may be provided in pocket 42 in electrical contact with the IC chip. As may be appreciated, the antenna and IC chip may be provided for contactless RF signal transmissions with a contactless chip card reader device to complete a financial transaction (e.g. at an ATM location, a point of sale location, etc.), in compliance with ISO/IEC Standard 1443. In one approach, contact pads 44 may be supportably interconnected to an outward-facing side of a non-conductive substrate and an IC chip and electrically interconnected antenna may be supportably interconnected to an inward-facing side of the substrate, wherein the contact pads are electrically interconnected to the IC chip through the substrate. In some arrangements, an elite brand mark 41 may also be provided on the first side of transaction card 1.

As shown in FIG. 1B, transaction card 1 may also include a magnetic stripe 43 affixed to the second side of the transaction card 1. The magnetic stripe 43 may be encoded during card personalization with personalization data unique to the transaction card 1 (e.g. data corresponding with the account indicated by visible indicia 40a). The magnetic stripe 43 may be provided in compliance with ISO/IEC Standard 7811. As further shown, a signature block 45 and/or hologram 47 may also be affixed to the second side of the transaction card 1 (e.g. via hot-stamping).

Figure 2:
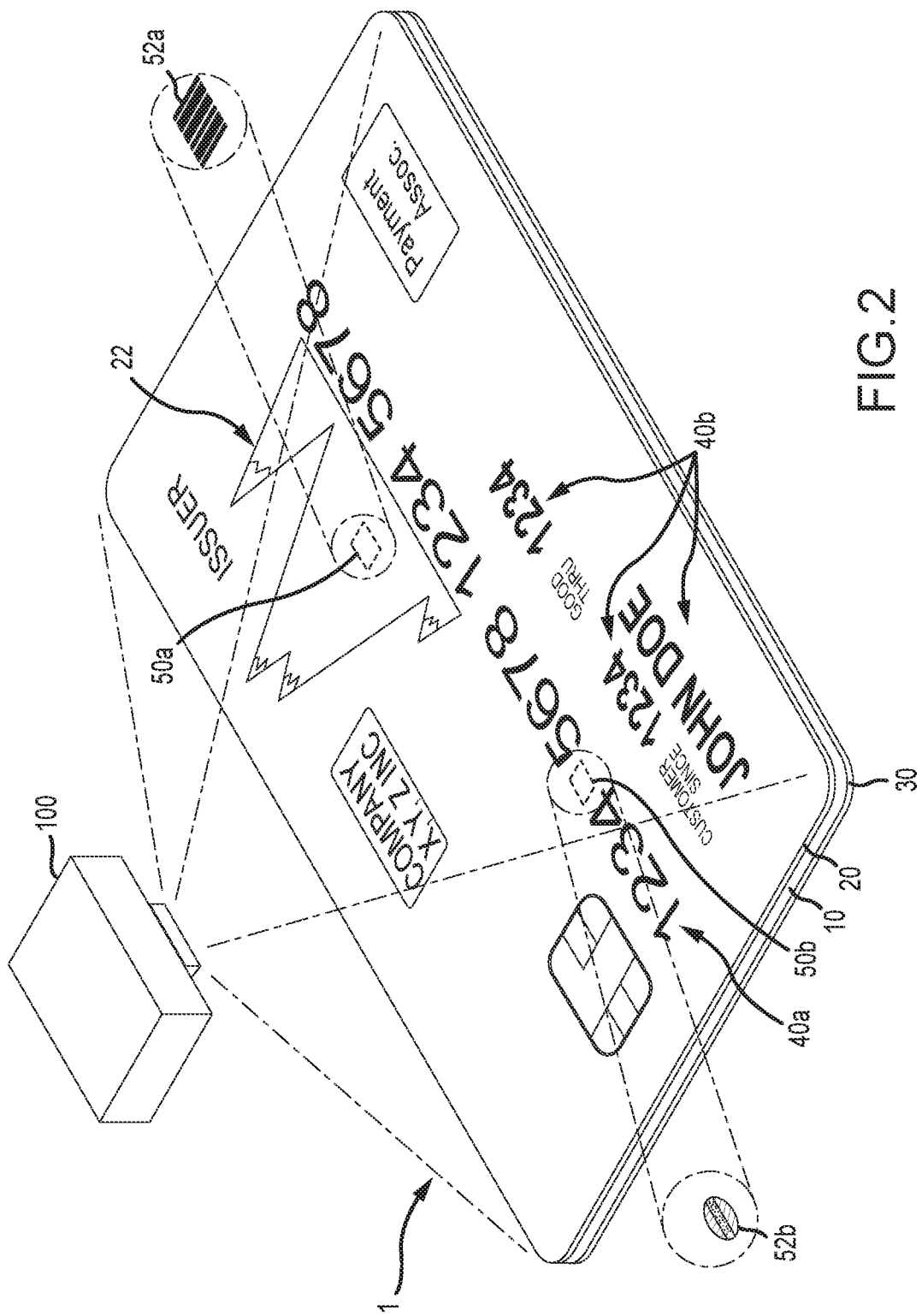
FIG. 2 is a schematic perspective view of one embodiment of non-visible production indicia detection equipment viewing the front side of the data bearing card embodiment shown in FIG. 1A.

Reference is now made to FIG. 2 which illustrates a detection device 100 for use in viewing the transaction card 1 shown in FIGS. 1A and 1B to render visible complimentary and otherwise non-visible production indicia provided in one or more predetermined location 50a, 50b and/or 50c thereof. In the embodiment shown in FIG. 2, predetermined location 50a is illustrated to reflect production indicia in the form of a non-visible ink marking 52a, e.g. a machine-readable marking. By way of example, such non-visible ink marking 52a may comprise ultra-violet light-sensitive ink, infrared light-sensitive ink and/or polarized light-sensitive ink printed in the predetermined location 50a, wherein the detection device 100 may comprise a corresponding source of ultra-violet light, infrared light and/or polarized light, respectively, so as to render visible the production indicia. In some embodiments, the production indicia may be read by a compatible reader device (e.g. included with detection device 100) to determine the corresponding production information, as described herein. In some embodiments, one or more non-visible ink marking 52a may be printed in conjunction with printing 22 and/or printing 32 (e.g. as part of a continuous printing process).

As further shown in FIG. 2, predetermined location 50b is illustrated to reflect production indicia in the form of a non-visible particle 52b. By way of example, the particle 52b may be a micro-particle taggant, wherein the detection device 100 may comprise magnification componentry so that one or more colored layers of the micro-particle taggant may be identified and correlated to a predetermined meaning to obtain the corresponding production information. Additionally or alternatively, the detection device 100 may comprise a corresponding source of ultra-violet light or infrared light so that one or more layers of the micro-particle taggant that comprise ultra-violet light sensitive or infrared light sensitive coloration may be identified and correlated to a predetermined meaning to obtain the corresponding production information. Additionally or alternatively, the microparticle taggant may comprise human-readable characters and/or machine-readable markings from which production-related information may be determined. In some embodiments, a plurality of particles 52*b* with substantially identical production indicia may be dispersed across transaction card 1. For example, the particles 52*b* may be included in an ink utilized for printing 22 and/or printing 32 or otherwise included in a material utilized to fabricate a layer of transaction card 1 and/or a coating applied thereto.

As noted above, data bearing transaction card 1 may be produced as one of a corresponding plurality of data bearing transaction cards (e.g. to realize production efficiencies). In that regard, reference is now made to FIGS. 3 and 4 which illustrate a multi-sheet assembly 200 having a predetermined plurality of regions 201 (e.g. arranged in three rows and three columns) from which nine card bodies 2 may be separated, wherein each of the regions 201 includes a corresponding predetermined location 50 comprising corresponding non-visible production indicia. In contemplated embodiments, a larger multi-sheet assembly may be utilized to yield a greater number of card bodies 2 (e.g. 56 regions/card bodies 2 arranged in eight rows and seven columns or 28 regions/card bodies 2 arranged in four rows and seven columns).

Figure 3:
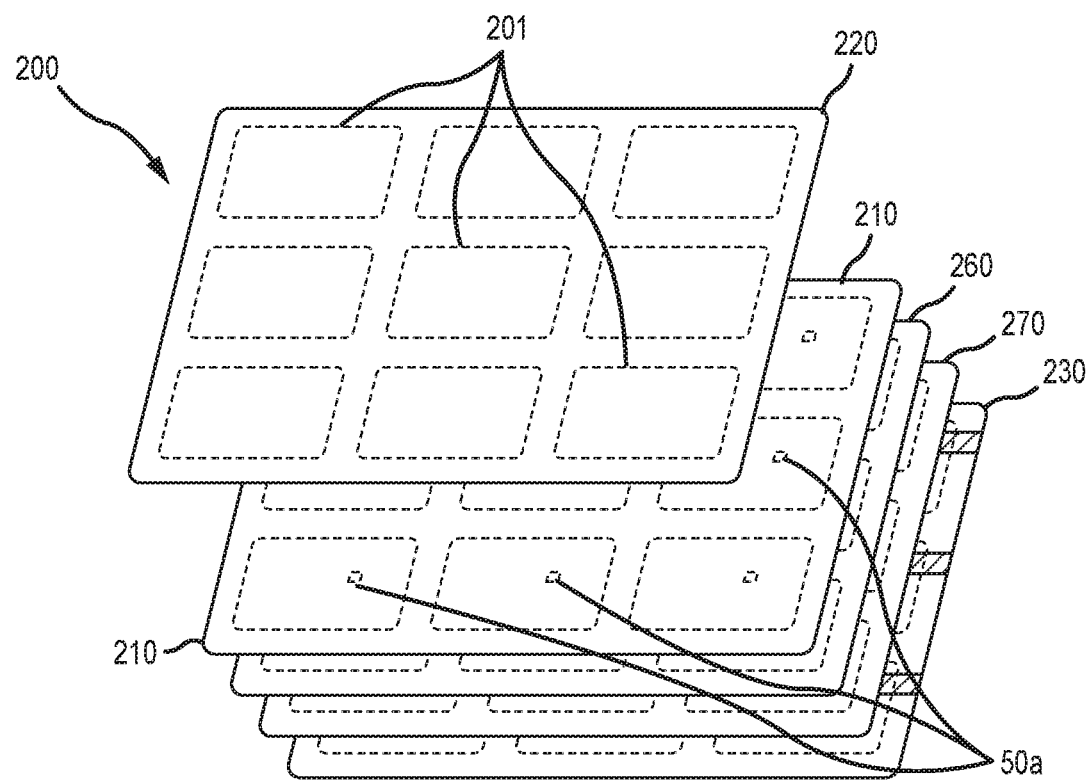
FIG. 3 is an exploded perspective view of an embodiment of a multi-sheet assembly that includes a predetermined plurality of regions from which a corresponding plurality of card bodies may be separated, each of such regions including a corresponding predetermined location comprising non-visible production indicia.

As shown in FIG. 3, the multi-sheet assembly 200 may include a first outer layer sheet 220 (e.g. corresponding with first outer layer 20 shown in FIGS. 1A and 1B), an interfacing first core layer sheet 210 (e.g. corresponding with first core layer 10 shown in FIGS. 1A and 1B), an interfacing intermediate layer sheet 260 (e.g. corresponding with an intermediate layer as described above), a second core layer sheet 270 (e.g. corresponding with a second core layer as described above), and a second outer layer sheet 230 (e.g. corresponding with second outer layer 30 shown in FIGS. 1A and 1B), wherein the interfacing sheet layers are arranged in stacked co-relation. Further, while not shown, additional polymer-based adhesive sheet-like layers may be provided between each of the interfacing layers of the multi-sheet assembly 200. For example, each of the polymer based adhesive sheet-like layers may comprise a thermoplastic and/or thermosetting coating coated on at least one of each interfacing set of surfaces of the various sheet layers comprising multi-sheet assembly 200.

Figure 4:
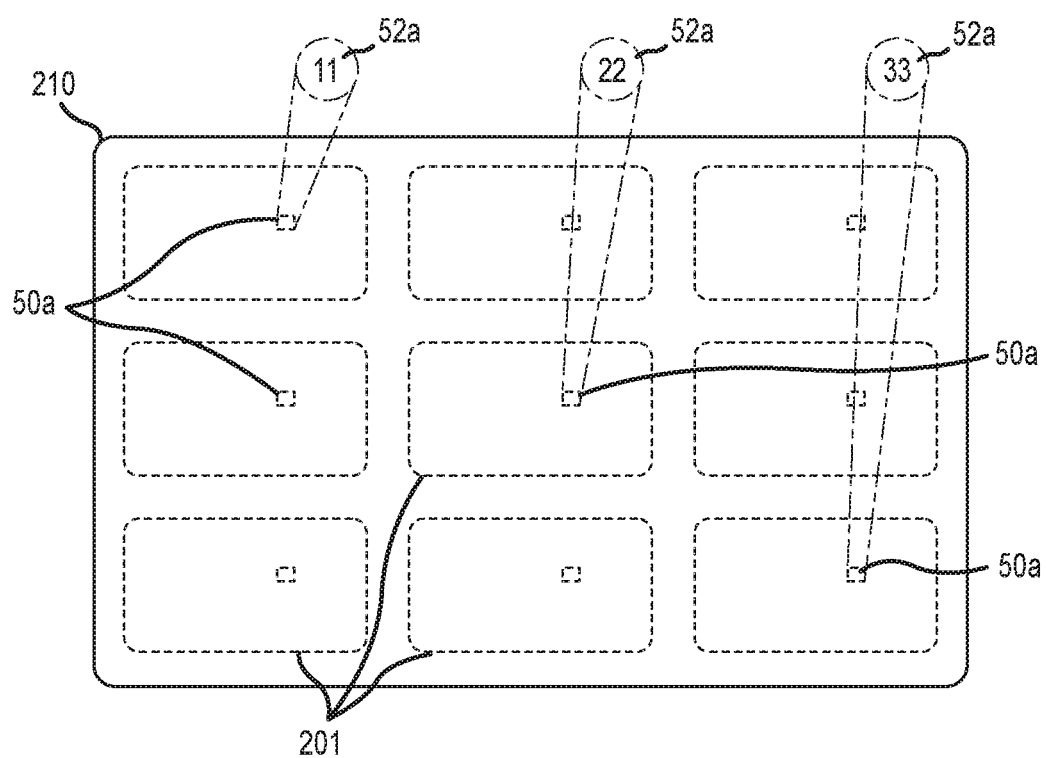
FIG. 4 illustrates a plan view of a sheet layer comprising the multi-sheet assembly embodiment of FIG. 3 and including a predetermined plurality of regions from which a corresponding plurality of card bodies may be separated, each of such regions including a corresponding predetermined location comprising non-visible production indicia.

As shown in FIGS. 3 and 4, the predetermined locations 50*a* comprising corresponding non-visible production indicia may be provided on the first core sheet 210 at common locations within each of the predetermined plurality of regions 201 of sheet assembly 200. By way of example, FIG. 4 illustrates non-visible production indicia in the form of non-visible ink marking 52*a* printed in each of the predetermined locations 50*a*, wherein upon illumination by a complimentary detection device (e.g. detection device 100 described above) any given one of the markings becomes visible to indicate the corresponding row and column region of a corresponding one of the predetermined plurality of regions 201 comprising multi-sheet assembly 200. In turn, and as otherwise described herein, upon separation of a plurality of card bodies 2 in corresponding relation to the predetermined plurality of regions 201 of multi-sheet assembly 200, the location within the multi-sheet assembly 200 from which any given one of the card bodies 2 has been separated may be determined by detection of the corresponding production indicia in the corresponding predetermined location 50*a* of such card body 2. In turn, in the event such card body 2 is found to be defective or near defective, production equipment corresponding with the row and/or location and/or column of such sheet assembly location may be focused upon for remedial action.

Figure 5:
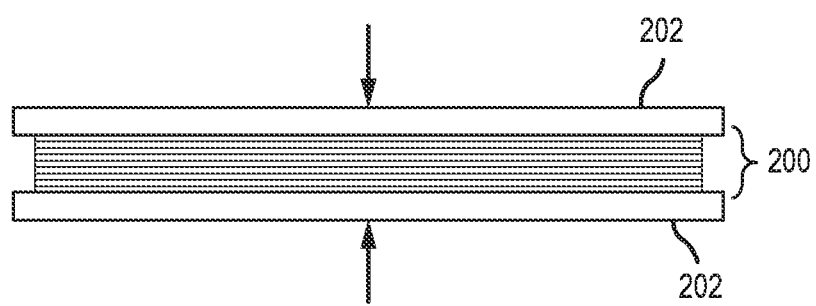
FIG. 5 is a schematic illustration of the multi-sheet assembly embodiment of FIG. 3 located within a lamination device to interconnect the multiple layers of the multi-sheet assembly embodiment.

To interconnect the various layers of multi-sheet assembly 200, the above-referenced polymer-based adhesive layers and/or thermosetting layers may be activated by heating and cooled. In that regard and with reference to FIG. 5, heat and pressure may be applied to the multi-sheet assembly 200 via opposing plattens 280 of a lamination device and opposing sides of the multi-sheet assembly 200.

Figure 6:
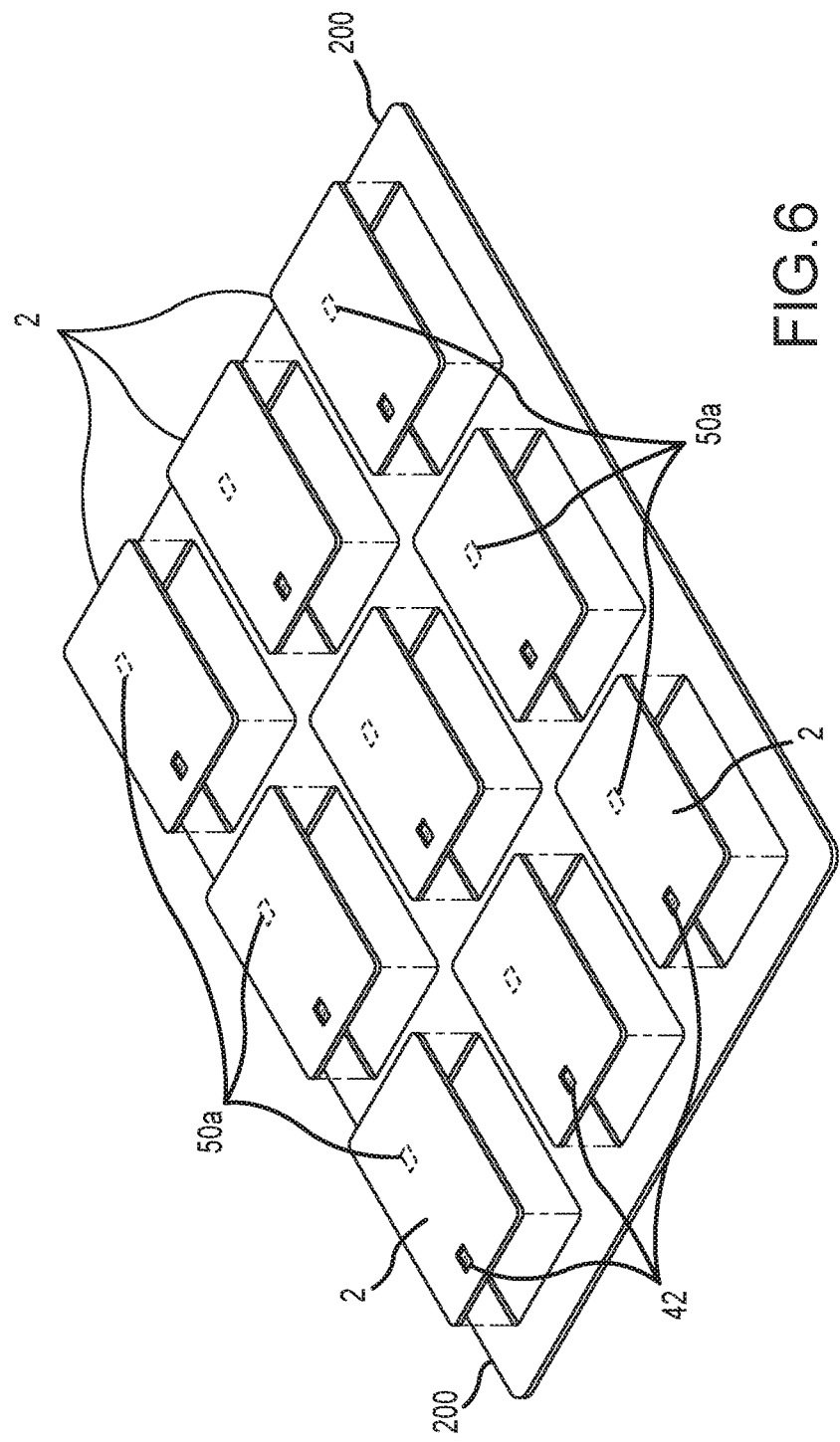
FIG. 6 is a perspective view of the interconnected multi-sheet assembly embodiment of FIGS. 3 and 5, having a plurality of card bodies separated at the predetermined plurality of regions shown in FIG. 3.

Following interconnection of the various layers of the multi-sheet assembly 200, a plurality of card bodies 2 may be separated from the multi-sheet assembly 200, as shown in FIG. 6. Further, prior to, in conjunction with, or after such separation, pockets 42 may be defined in predetermined relation to each of the card bodies 2 separated or to be separated from the multi-sheet assembly 200. After separation of the card bodies 2, the card bodies 2 may be separately processed to incorporate additional components as described above in relation to FIGS. 1A and 1B, and for prepersonalization encoding and personalization encoding/visible indicia defining purposes.

Figure 7:
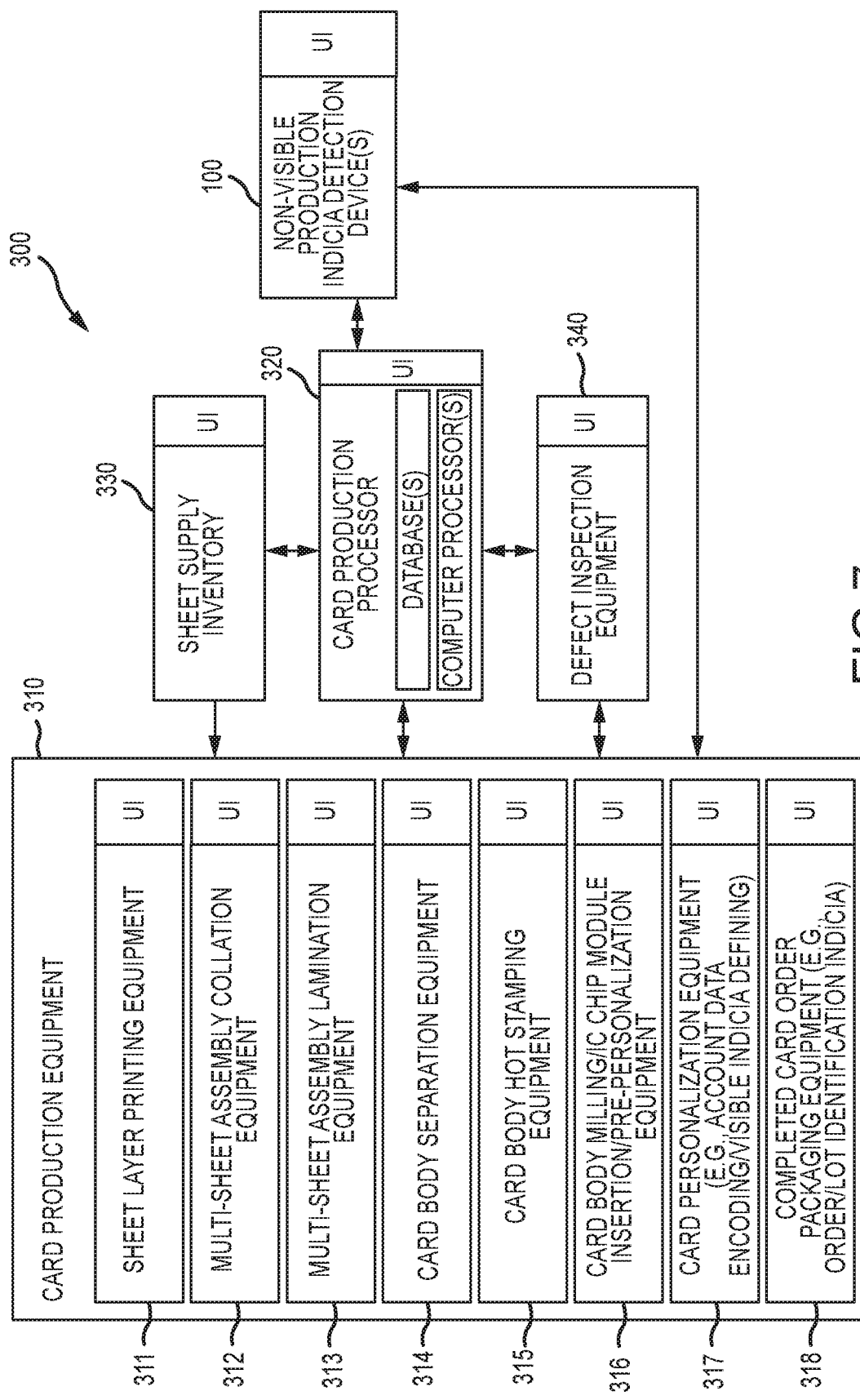
FIG. 7 illustrates a block diagram of one embodiment of a system for use in the production of data bearing cards comprising non-visible production indicia indicative of production-related information.

Reference is now made to FIG. 7 which illustrates one embodiment of a system 300 for use in the production of data bearing cards as described herein. The system 300 may include at least one piece of card production equipment 310 and a card production processor 320 for maintaining stored information pertaining to utilization of the card production equipment 310 in connection with the production of a plurality of data bearing cards (e.g. data bearing cards produced to fulfill a given order). Optionally, the card production processor 320 may be operatively interconnected with the card production equipment 310 to provide an output to and/or receive an input from the card production equipment 310 that comprises the stored information. Further, the card production processor 320 and production equipment 310 may each comprise a user interface (U/I) for the input (e.g. via a keyboard, touchscreen, etc.) and output (e.g. via a display, printer, etc.) of stored information.

Additionally, the system 300 may include at least one non-visible production indicia detection device(s) 100 or use in viewing at least one of the plurality of data bearing cards or corresponding plurality of card bodies to allow detection of the corresponding non-visible production indicia and a determination of the corresponding production-related information (e.g. human and/or automated detection and determination). In turn, the card production processor 320 may be operable to employ the corresponding production-related information and stored information to facilitate at least one of:

remedial action in response to the identification of defect or near-defect in the at least one of said plurality of data bearing cards or plurality of card bodies; and/or, tracking of the at least one of said plurality of data bearing cards or corresponding plurality of card bodies during production, wherein corresponding tracking information may be included with the stored information.

Optionally, the detection device(s) 100 may be operatively interconnected to the card production processor 320, and optionally operatively interconnected to the production equipment 310, to provide an input (e.g. an input corresponding with detected production indicia and/or production-related information determined therefrom) to the card production processor 320. In that regard, the detection device(s) 100 may comprise a user interface (U/I) for the input (e.g. via keyboard, touchscreen, etc.) and/or output (e.g. via a display, printer, etc.) of stored information and detected production indicia and/or production-related information determined therefrom.

By way of example, upon a determination that one or more data bearing cards of a plurality of data bearing cards produced utilizing system 300 is defective or near-defective, the detection device(s) 100 may be utilized to view the one or more defective or near-defective data bearing cards to facilitate detection of the otherwise non-visible production indicia corresponding therewith. In turn, corresponding production-related information may be determined and utilized at card production processor 320 so that remedial action may be taken.

In particular, the card production processor 320 may be provided to assist in the use of the determined production-related information to identify a source of a production defect or near-defect in a given one or more of a plurality of data bearing cards or corresponding card bodies, as being at least one of the following:
- a location of a corresponding one of a predetermined plurality of regions of a sheet assembly from which the corresponding card body was separated during production as one of a plurality of separated card bodies;
- a corresponding piece and/or portion of equipment utilized in connection with the production of the corresponding data bearing card(s);
- at least one of a corresponding type of and corresponding source of material utilized to produce the corresponding data bearing card(s);
- at least one corresponding operator of at least one corresponding piece of equipment utilized in connection with the production of the corresponding data bearing card(s);
- a corresponding process utilized in connection with the production of the corresponding data bearing card(s); and,
- a corresponding production batch produced to fulfill a corresponding order for a plurality of data bearing cards that includes said corresponding data bearing card(s).

For example, the card production processor 320 may be operable to associate the determined production related information with stored information to provide an output indicative of the source of the defect or near-defect. In turn, a card manufacturer may focus remedial action upon the identified source of the production defect or near-defect. In some instances, such remedial action may entail replacement, repair and/or adjustment of a given piece of production equipment 310.

As shown in FIG. 7, the card production equipment 310 may include one or more of the following pieces/types of equipment:
- sheet layer printing equipment 311 (e.g. automated equipment for lithographic printing, screen printing, ink jet printing, intaglio printing, etc. of first core layer sheet 210 and/or second core layer sheet 270 of multi-sheet assembly 200 described above);
- multi-sheet assembly collation equipment 312 (e.g. automated equipment for collating the stacked, interfacing layers of multi-sheet assembly 200 described above);
- multi-sheet assembly lamination equipment 313 (e.g. automated lamination device for interconnecting various layers of multi-sheet assembly 200 described above);
- card body separation equipment 314 (e.g. automated punch or milling device for separating card bodies from multi-sheet assembly 200 described above);
- card body hot stamping equipment 315 (e.g. automated equipment for applying a hot stamp to each data bearing card described above);
- card body milling/machining/IC chip module insertion/pre-personalization equipment 316 (e.g. automated equipment for pocket milling, IC chip module insertion, and IC chip pre personalization encoding of each data bearing card described above);
- card personalization equipment (e.g. account data encoding/visible indicia) 317 (e.g. automated equipment for IC chip personalization encoding of each data bearing card described above); and,
- card order counting and auditing equipment (not shown) (e.g. automated equipment for counting the number and auditing the accuracy of data bearing cards to be provided in fulfillment of a corresponding order and/or portion thereof);
- completed card order packaging and marking (e.g. order/lot identification marking) equipment 318 (e.g. automated equipment for packaging a plurality of data bearing cards and applying a marking to identify a corresponding order and/or order portion thereof).

Additionally, system 300 may include a sheet supply inventory 330 for storing the various sheet layers and/or rolls of material employed for defining one or more sheet layers comprising a given sheet assembly as otherwise described herein. The sheet supply inventory 330 may be provided with a user interface (U/I) for the input (e.g. via a keyboard, touchscreen, etc.) and output (e.g. via a display, printer, etc.) of stored information. Further, system 300 may include defect inspection equipment 340 for automated detection of defects or near-defects in the data bearing cards or associated card bodies, wherein corresponding defect information may be provided to card production processor 320 for storage with the stored information and/or use in relation to production remedial action.

In some embodiments, detection device(s) 100 may be provided at one or more locations corresponding with the production equipment 310 (e.g. a separate detection device 100 may be located at any or all of the production equipment 311-318 and inspection equipment 340) for use in the detection of non-visible production indicia and determination of production-related information, wherein the production-related information and/or detected production indicia, and associated production equipment information (e.g. information identifying the equipment and a time at which the production indicia was detected), may be provided to and processed by and/or included in stored information at the card production processor 320. In turn, such information may be employed to facilitate remedial action pursuant to an identified defect or near-defect and/or to track data bearing cards and associated card bodies during production (e.g. production-related information indicative of a batch of cards corresponding with a given order may be employed with associated production equipment information to provide production status information, scheduling information and/or to assess and address resource requirements).

As may be appreciated, the card production processor 320 may include one or more computer processor(s) having associated memory comprising preprogrammed instructions for configuring the computer processor(s) to process the stored information and detected production indicia and/or production-related information determined therefrom, and one or more databases(s) comprising the stored information pertaining to utilization of the card production equipment 310 for production of a plurality of data bearing cards. In that regard, the stored information may further comprise order-specific information relating to an order corresponding with a given plurality of data bearing cards, including for example order corresponding identification information (e.g. an order number, a job, sub job or batch number or other identifier), corresponding order type information (e.g. information indicating an initial order production run, an order remake, an order rework, etc.), corresponding information identifying card specifications for the data bearing cards included in the given order, and/or production equipment set-up and operating parameters employed or optionally employable for the production of the given order.

Various embodiments may comprise any number of combinations of apparatus and/or method features described above and/or hereinbelow. Such combinations may include those encompassed by the following Embodiments:

1. A data bearing card, comprising:
a card body;
personalization data unique to the data bearing card; and,
non-visible production indicia, disposed on the card body and indicative of production-related information not otherwise provided on the data bearing card.

2. A data bearing card as recited in Embodiment 1, wherein said non-visible production indicia is disposed in a predetermined location on the card body, separate from said personalization data.

3. A data bearing card as recited in Embodiment 1 or Embodiment 2, wherein said non-visible production indicia is indicative of at least one of the following:
a location of a corresponding one of a predetermined plurality of regions of a sheet assembly from which the corresponding card body was separated during production as one of a plurality of separated card bodies;
a corresponding piece of equipment utilized in connection with the production of the corresponding data bearing card or card body;
at least one of a corresponding type of and corresponding source of material utilized to produce the corresponding card body;
at least one corresponding operator of at least one corresponding piece of equipment utilized in connection with the production of the corresponding data bearing card or card body;
a corresponding process utilized in connection with the production of the corresponding data bearing card or card body; and,
a corresponding production batch produced to fulfill a corresponding order for a plurality of data bearing cards that includes the corresponding data bearing card.

4. A data bearing card as recited in any one of Embodiments 1-3, wherein said non-visible production indicia comprises at least one of the following:
a non-visible ink; and,
at least one non-visible particle.

5. A data bearing card as recited in any one of Embodiments 1-4, wherein said non-visible production indicia comprises a non-visible ink that comprises at least one of the following:
an ultra-violet light sensitive ink;
an infrared light sensitive ink; and,
a polarized light sensitive ink.

6. A data bearing card as recited in any one of Embodiments 1-5, wherein said non-visible production indicia comprises a non-visible ink and is provided as a printed marking.

7. A data bearing card as recited in any one of Embodiments 1-6, wherein said non-visible production indicia comprises at least one non-visible particle having a maximum cross dimension less than about 0.1 mm.

8. A data bearing card as recited in any one of Embodiments 1-7, wherein said non-visible production indicia comprises at least one of a plurality of non-visible particles dispersed across said card body and each having a maximum cross dimension less than about 0.1 mm.

9. A data bearing card as recited in any one of Embodiments 1-8, wherein said non-visible production indicia comprises at least one non-visible particle that comprises at least one of:
a micro-particle taggant that includes at least one colorized layer to define said non-visible production indicia; and,
a micro-particle taggant that includes at least one layer having a coloration that is one of ultra-violet light sensitive and infrared light sensitive.

10. A data bearing card as recited in any one of Embodiments 1-9, wherein said non-visible production indicia comprises at least one non-visible particle that comprises:
a micro-particle taggant that includes a marking thereupon to define said non-visible production indicia.

11. A data bearing card as recited in any one of Embodiments 1-10, wherein said card body comprises:
a first core layer, wherein said non-visible production indicia is provided on a first side of the first core layer; and,
a transparent first outer layer disposed over the first side of the first core layer.

12. A data bearing card as recited in any one of Embodiments 1-11, wherein said non-visible production indicia comprises a non-visible ink and is provided as a printed marking.

13. A data bearing card as recited in any one of Embodiments 1-12, further comprising:
visible printing printed on said first core layer, wherein said visible printing and said non-visible production indicia are both disposed in a common region on the first core layer.

14. A data bearing card as recited in any one of Embodiments 1-13, wherein said visible printing and said non-visible production indicia are each printed on said first core layer in a continuous printing operation.

15. A data bearing card as recited in any one of Embodiments 1-14, wherein said visible printing comprises at least one of:
visible graphics;
visible human-readable characters; and,
a visible machine-readable marking.

16. A sheet assembly for providing a plurality of card bodies for use in a corresponding plurality of data bearing cards, comprising:
at least a first layer;
non-visible production indicia disposed at a predetermined location within each of a predetermined plurality of regions on the first layer, wherein each of said predetermined plurality of regions corresponds with a different one of said plurality of card bodies, and wherein for each of said predetermined plurality of regions said non-visible indicia is indicative of production-related information.

17. A sheet assembly as recited in Embodiment 16, wherein for each given region of said predetermined plurality of regions, said non-visible production indicia is indicative of at least one of the following:
a corresponding location of the given region on said sheet assembly;
a corresponding piece of equipment utilized in connection with the production of the corresponding card body;
at least one of a corresponding type of and a corresponding source of material comprising said sheet assembly;

a corresponding process utilized in connection with the production of the corresponding data bearing card or card body; and, at least one corresponding operator of at least one corresponding piece of equipment utilized in connection with the production of the corresponding card body.

18. A sheet assembly as recited in Embodiment 16 or Embodiment 17, wherein said predetermined plurality of regions are arranged in a predetermined plurality of rows and columns, and wherein for each given region of said predetermined plurality of regions said non-visible production indicia is indicative of at least one or both of a corresponding row and corresponding column of the given region.

19. A sheet assembly as recited in any one of Embodiments 16-18, wherein for each of said predetermined plurality of regions said non-visible production indicia comprises at least one of the following:

a non-visible ink printed on said first layer; and, a non-visible particle supported by said first layer.

20. A sheet assembly as recited in any one of Embodiments 16-19, further comprising:

a transparent second layer interconnected to the first layer and overlaying said non-visible production indicia of each of said plurality of regions.

21. A method for use in connection with the production of a plurality of data bearing cards that each include a corresponding card body, corresponding personalization data unique to the data bearing card, and corresponding non-visible production indicia indicative of production-related information not otherwise provided on the data bearing card, comprising:

providing non-visible production indicia in each of a plurality of regions on at least one of a top surface and a bottom surface of a first layer of a sheet assembly, said non-visible production indicia being indicative of production-related information;

separating a plurality of card bodies from said sheet assembly in corresponding relation to said plurality of regions; and, supplying personalization data to each of said plurality of card bodies to define said plurality of data bearing cards, after said providing and separating steps.

22. A method as recited in Embodiment 21, wherein for each given region of said predetermined plurality of regions, said non-visible production indicia is indicative of at least one of the following:

a corresponding location of the given region on said sheet assembly;

a corresponding piece of equipment utilized in connection with the production of the corresponding card body;

at least one of a corresponding type of and a corresponding source of material comprising said sheet assembly;

a corresponding process utilized in connection with the production of the corresponding data bearing card or card body; and, at least one corresponding operator of at least one corresponding piece of equipment utilized in connection with the production of the corresponding card body.

23. A method as recited in Embodiment 21 or Embodiment 22, wherein said predetermined plurality of regions are arranged in a predetermined plurality of rows and columns, and wherein for each given region of said predetermined plurality of regions said non-visible production indicia is indicative of at least one or both of a corresponding row and corresponding column of the given region.

24. A method as recited in any one of Embodiments 21-23, wherein for each of said predetermined plurality of regions said non-visible production indicia comprises at least one of the following:

a non-visible ink printed on said first layer; and, a non-visible particle supported by said first layer.

25. A method as recited in any one of Embodiments 21-24, further comprising:

interconnecting a transparent first outer layer sheet to said at least one of a top surface and a bottom surface of the first layer, prior to said separating and supplying steps.

26. A method as recited in any one of Embodiments 21-25, said providing comprising: printing said non-visible production indicia in each of said plurality of regions on said at least one of a top surface and a bottom surface of the first layer.

27. A method as recited in any one of Embodiments 21-26, said printing further comprising:

printing at least one of the following in each of a plurality of regions on said at least one of a top surface and a bottom surface of the first layer:

visible graphics;

visible human-readable characters; and, a visible machine-readable marking.

28. A method as recited in any one of Embodiments 21-27, further comprising:

interconnecting a transparent first outer layer sheet to said at least one of a top surface and a bottom surface of the first layer, prior to said separating and supplying steps 29. A method as recited in any one of Embodiments 21-28, further comprising:

using a detection device to view said non-visible production indicia in at least one or a plurality of said plurality of regions in relation to at least one or both of said printing step and said interconnecting step, wherein said corresponding production-related information is employable to track said sheet assembly during production.

30. A method as recited in any one of Embodiments 21-29, further comprising:

using a detection device to view said non-visible production indicia on at least one of said plurality of card bodies or data bearing cards, wherein said corresponding production-related information is employable to facilitate remedial action in response to an identified defect or near-defect.

31. A system for use in connection with the production of a plurality of data bearing cards that each include a corresponding one of a plurality of card bodies separated from a sheet assembly, corresponding personalization data unique to the data bearing card, and corresponding non-visible production indicia indicative of product-related information not otherwise provided on the data bearing card, comprising:

card production equipment for use in connection with the production of the plurality of data bearing cards;

a card production processor for receiving and maintaining stored information pertaining to utilization of the card production equipment in connection with the production of the plurality of data bearing cards;

at least one detection device for use in viewing at least one of said plurality of data bearing cards or plurality of card bodies to allow detection of the corresponding non-visible production indicia and a determination of the corresponding production-related information, wherein said card production processor is operable to employ the corresponding production-related information and stored information to facilitate at least one of:

remedial action in response to the identification of defect or near-defect in the at least one of said plurality of data bearing cards or plurality of card bodies; and, tracking of the at least one of said plurality of data bearing cards or plurality of card bodies during production.

32. A system as recited in Embodiment 31, wherein for each of said plurality of data bearing cards, said non-visible production indicia is indicative of at least one of the following:

a location of a corresponding one of a predetermined plurality of regions of a sheet assembly from which the corresponding card body was separated during production as one of a plurality of separated card bodies;

a corresponding piece of equipment utilized in connection with the production of the data bearing card or corresponding card body;

at least one of a corresponding type of and corresponding source of material utilized to produce the corresponding card body;

at least one corresponding operator of at least one corresponding piece of equipment utilized in connection with the production of the data bearing card or corresponding card body;

a corresponding process utilized in connection with the production of the data bearing card or corresponding card body; and, a corresponding production batch produced to fulfill a corresponding order for said plurality of data bearing cards.

33. A system as recited in Embodiment 31 or Embodiment 32, wherein for each said plurality of data bearing cards, said corresponding non-visible production indicia comprises at least one of the following:

a non-visible ink; and, at least one non-visible particle.

34. A system as recited in any one of Embodiments 31-33, wherein for each said plurality of data bearing cards, said corresponding non-visible production indicia comprises at least one of the following:

an ultra-violet light sensitive ink;

an infrared light sensitive ink; and, a polarized light sensitive ink.

35. A system as recited in any one of Embodiments 31-34, wherein for each of said plurality of data bearing cards said corresponding non-visible production indicia is provided as a printed marking, and wherein said production equipment comprises:

printing equipment for providing said printed marking and visible printing on each of said plurality of data bearing cards in a continuous operation.

36. A system as recited in any one of Embodiments 31-35, wherein said visible printing comprises at least one of:

visible graphics;

visible human-readable characters; and, a visible machine-readable marking.

37. A system as recited in any one of Embodiments 31-36, wherein said production equipment includes at least two or more of the following types of production equipment:

printing equipment;

collation equipment;

lamination equipment;

card body separation equipment;

card body hot stamping equipment;

card body milling/machining/integrated circuit chip module insertion/pre-personalization equipment;

card personalization equipment;

defect or near-defect identification equipment;

card order counting and auditing equipment; and, card order packaging and marking equipment;

wherein said at least one detection device comprises:

a first detection device for use in viewing said non-visible production indicia on at least one of said plurality of card bodies or data bearing cards, wherein said card production processor is operable to employ the corresponding production-related information and stored information to track a location of said at least one of said plurality of data bearing cards or plurality of card bodies at or between said at least two or more types of production equipment.

38. A system as recited in any one of Embodiments 31-37, wherein said stored information further comprises:

order-specific information relating to a specific order corresponding with said plurality of data bearing cards.

39. A system as recited in any one of Embodiments 31-38, wherein said order-specific information comprises at least one of the following:

order identification information;

order type information;

information identifying card specifications for the data bearing cards included in the given order; and, production equipment set-up and operating parameters employed or optionally employable for the production of the given order.

The foregoing description of the present invention has been presented for purposes of illustration and description. The description is not intended to limit the invention to the form disclosed herein. Consequently, variations and modifications of the above teachings, utilizing skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art and applicable legal precedent.

What is claimed is:

1. A data bearing card, comprising:

a card body;

personalization data unique to the data bearing card; and, non-visible production indicia integrated into the card body and corresponding with the data bearing card, the non-visible production indicia being production-related information not otherwise provided on the data bearing card, wherein the production-related information includes at least one of a corresponding piece of equipment utilized to manufacture the card body, a type of material used to manufacture the card body, or a source of material utilized to manufacture the card body, wherein the production-related information identifies defects to the card body associated with at least one of the corresponding piece of equipment utilized to manufacture the card body, the type of material used to manufacture the card body, or the source of material utilized to manufacture the card body.

2. A data bearing card as recited in claim 1, wherein the non-visible production indicia is disposed in a predetermined location on the card body, separate from the personalization data.

3. A data bearing card as recited in claim 1, wherein the production-related information of the non-visible production indicia further includes at least one of the following:

a location of a corresponding one of a predetermined plurality of regions of a sheet assembly from which the corresponding card body was separated during production as one of a plurality of separated card bodies;

at least one corresponding operator of at least one corresponding piece of equipment utilized in connection with the production of the corresponding data bearing card or card body;

a corresponding process utilized in connection with the production of the corresponding data bearing card or card body; and, a corresponding production batch produced to fulfill a corresponding order for a plurality of data bearing cards that includes the corresponding data bearing card.

4. A data bearing card as recited in claim 1, wherein the non-visible production indicia comprises at least one of the following:

a non-visible ink; and, at least one non-visible particle.

5. A data bearing card as recited in claim 4, wherein the non-visible production indicia comprises a non-visible ink that comprises at least one of the following:

an ultra-violet light sensitive ink;
an infrared light sensitive ink; and,
a polarized light sensitive ink.

6. A data bearing card as recited in claim 4, wherein the non-visible production indicia comprises at least one non-visible particle that comprises at least one of:

a micro-particle taggant that includes at least one colorized layer to define the non-visible production indicia; and a micro-particle taggant that includes at least one layer having a coloration that is at least one of ultra-violet light sensitive or infrared light sensitive.

7. A data bearing card as recited in claim 4, wherein the non-visible production indicia comprises at least one non-visible particle that comprises:

a micro-particle taggant that includes a marking thereupon to define the non-visible production indicia.

8. A data bearing card as recited in claim 1, wherein the card body comprises one of more core layers, wherein the non-visible production indicia is provided on a core layer of the one or more core layers.

9. The data bearing card of claim 1, wherein the production-related information facilitates remedial action in response to an identified defect or near-defect.

10. The data bearing card of claim 1, wherein the production-related information comprises source-identification information of the data bearing card that allows the presence of the data-bearing card to be identifiable in the manufacturing processes.

11. The data bearing card of claim 10, wherein the source-identification information of the data bearing card allows the presence of the data-bearing card to be identifiable at production equipment of the manufacturing process to support remedial action at the production equipment.

12. The data bearing card of claim 1, wherein non-visible production indicia is visible to the human eye only when viewed using a complementary detection device.

13. A method for use in connection with the production of a plurality of data bearing cards that each include a corresponding card body of a plurality of card bodies, corresponding personalization data unique to the data bearing card, and corresponding non-visible production indicia integrated into the card body and corresponding with the data bearing card, the non-visible production indicia being production-related information not otherwise provided on the data bearing card, comprising:

providing non-visible production indicia in a plurality of regions on at least one of a top surface and a bottom surface of a first layer of a sheet assembly, the non-visible production indicia being production-related information that includes at least one of a corresponding piece of equipment utilized to manufacture the card body, a type of material used to manufacture the card body, or a source of material utilized to manufacture the card body, wherein the production-related information identifies defects to the corresponding card bodies of the plurality of data bearing cards associated with at least one of the corresponding piece of equipment utilized to manufacture the card body, the type of material used to manufacture the card body, or the source of material utilized to manufacture the card body;

separating the plurality of card bodies from the sheet assembly in corresponding relation to the plurality of regions; and supplying personalization data to each of the plurality of card bodies to define the plurality of data bearing cards, after the providing and separating steps.

14. A method as recited in claim 13, wherein for the given region of the predetermined plurality of regions, the production-related information of the non-visible production indicia is further indicative of at least one of the following:

a corresponding location of the given region on the sheet assembly;

a corresponding process utilized in connection with the production of the corresponding data bearing card or card body; and, at least one corresponding operator of at least one corresponding piece of equipment utilized in connection with the production of the corresponding card body.

15. A method as recited in claim 14, wherein the predetermined plurality of regions are arranged in a predetermined plurality of rows and columns, and wherein for each given region of said predetermined plurality of regions the production-related information of the non-visible production indicia is at least one or both of a corresponding row and corresponding column of the given region.

16. A method as recited in claim 13, further comprising:
interconnecting a transparent first outer layer sheet to the at least one of a top surface and a bottom surface of the first layer, prior to the separating and supplying steps.

17. A method as recited in claim 13, the providing comprising:

printing the non-visible production indicia in each of the plurality of regions on the at least one of a top surface and a bottom surface of the first layer.

18. A method as recited in claim 13, further comprising:
using a detection device to view the non-visible production indicia in at least one or a plurality of the plurality of regions in relation to at least one or both of the printing step and the interconnecting step, wherein the corresponding production-related information is employable to track said sheet assembly during production.

19. A method as recited in claim 13, further comprising:
using a detection device to view the non-visible production indicia on at least one of plurality of card bodies or data bearing cards, wherein the corresponding production-related information is employable to facilitate remedial action in response to an identified defect or near-defect.

20. A financial transaction card comprising:
a card body comprising a plurality of layers interconnected together;
card information printed on one or more of the plurality of layers; and
production indicia integrated into the card body and corresponding with the financial transaction card, wherein the production indicia is production-related information that includes at least one of a corresponding piece of equipment utilized to manufacture the card body, a type of material used to manufacture the card body, or a source of material utilized to manufacture the card body, wherein the production-related information identifies defects to the card body associated with at least one of the corresponding piece of equipment utilized to manufacture the card body, the type of material used to manufacture the card body, or the source of material utilized to manufacture the card body, and the production indicia is configured to be identifiable by a detection device that identifies defects in the card body due to defective manufacturing processes based on the production indicia, and wherein the production indicia is not visible to the human eye.

21. The financial transaction card of claim 20, wherein the production indicia is configured to be identifiable by a detection device such that the detection device executes one or more operations for obtaining production-related information.

22. The financial transaction card of claim 21, wherein the detection device is operatively coupled with production equipment used in the manufacturing process of the financial transaction card, and the production indicia is configured to be identifiable by the detection device such that the production equipment initiates a remedial action.

* * * * *